(12) United States Patent
Leoni et al.

(10) Patent No.: US 12,412,309 B2
(45) Date of Patent: Sep. 9, 2025

(54) CHEMICAL PURITY ASSESSMENT BY IMAGE ANALYSIS

(71) Applicant: Saudi Arabian Oil Company, Dhahran (SA)

(72) Inventors: Matteo Leoni, Dhahran (SA); Salman J. Al-Khaldi, Dhahran (SA); Rafael M. Pino, Al Khobar (SA); Juan Carlos Rojas, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 480 days.

(21) Appl. No.: 18/047,025

(22) Filed: Oct. 17, 2022

(65) Prior Publication Data
US 2024/0127483 A1   Apr. 18, 2024

(51) Int. Cl.
*G06T 7/00*   (2017.01)
*G06T 7/90*   (2017.01)

(52) U.S. Cl.
CPC .............. *G06T 7/90* (2017.01); *G06T 7/0004* (2013.01)

(58) Field of Classification Search
CPC ....................................................... G06T 7/90
USPC ....................................................... 382/165
See application file for complete search history.

(56) References Cited

U.S. PATENT DOCUMENTS

| | | | |
|---|---|---|---|
| 5,127,039 A | 6/1992 | Hesch et al. | |
| 5,946,102 A | 8/1999 | Holocomb et al. | |
| 2007/0207551 A1* | 9/2007 | Glensbjerg | B01L 3/502715 |
| | | | 422/105 |
| 2010/0134794 A1* | 6/2010 | Odegard | G01N 21/33 |
| | | | 356/326 |
| 2012/0134582 A1* | 5/2012 | Treado | G01J 3/28 |
| | | | 382/165 |
| 2014/0053656 A1 | 2/2014 | Gaddum | |
| 2019/0317022 A1* | 10/2019 | Nnanna | G01N 21/17 |
| 2020/0218346 A1* | 7/2020 | Eash | G02B 27/0093 |
| 2024/0201111 A1 | 6/2024 | Leoni et al. | |

FOREIGN PATENT DOCUMENTS

| | | |
|---|---|---|
| CN | 2746387 | 12/2005 |
| CN | 103293173 | 5/2015 |
| CN | 106918608 | 7/2017 |
| CN | 107966463 | 4/2018 |

* cited by examiner

*Primary Examiner* — Jamares Q Washington
(74) *Attorney, Agent, or Firm* — Fish & Richardson P.C.

(57) ABSTRACT

Systems and methods include a method for determining the purity of a sample. An image capture is performed of a reference material having a known purity and an unknown material having an unknown purity for which a priori information is known, including that the reference material and the unknown material have a same material type. An image comparison of the reference material and the unknown material is performed to determine a color difference vector between an image of the reference material and an image of the unknown material. A purity of the unknown material is determined using the color difference vector.

17 Claims, 7 Drawing Sheets

CHEMICAL PURITY ASSESSMENT BY IMAGE ANALYSIS

TECHNICAL FIELD

The present disclosure applies to techniques for assessing the purity of materials and compounds.

BACKGROUND

Proper assessments of the purity of a sample, such as a material or compound, can typically be conducted using analytical essays. Techniques that are commonly used for an elemental purity assessment include destructive, semi-destructive, and non-destructive techniques. Destructive techniques, e.g., based on plasma ionization, can include inductively coupled plasma-mass spectrometry (ICP-MS), ICP-optical emission spectroscopy (ICP-OES), and ICP-atomic emission spectroscopy (ICP-AES). Semi-destructive techniques can include, for example, laser-induced breakdown spectroscopy (LIBS). Non-destructive techniques, e.g., based on fluorescence, can include X-ray fluorescence (XRF) and energy-dispersive X-ray spectroscopy (EDXS). For phase (aka compound, aka chemical) purity assessment, X-ray powder diffraction is the usual choice. These techniques can be used to detect the presence of some atomic species by detecting the presence of corresponding signatures, or to detect the compounds by detecting the fingerprint of the underlying crystalline structure.

Each different type of material that may be assessed has a different absorption spectrum. Differences between different materials can be observed in the visible range. The differences can be captured, e.g., by using an ultraviolet-visible (UV-VIS) spectrometer. When two or more compounds are mixed, the compounds' absorption properties are combined. In the case of a purity evaluation, the major compound being evaluated is typically known. If the corresponding absorption spectrum is known, it is therefore possible, by comparison, to determine if the sample is pure or not. Moreover, in a comparison of the known and measured spectra assisted by a calibration curve, it is possible to establish a quantitative purity. A UV-VIS spectrometer is typically needed for this type of analysis. No prior information is required for these types of analyses that can be used in the general case. However, dedicated instruments and long processing times are typically needed, especially to obtain phase composition information.

SUMMARY

The present disclosure describes techniques and an algorithm for assessing the chemical (or phase) purity of a material (or compound) based on an analysis of a color image. In some implementations, a computer-implemented method includes the following. An image capture is performed of a reference material having a known purity and an unknown material having an unknown purity for which a priori information is known, including that the reference material and the unknown material have a same material type. An image comparison of the reference material and the unknown material is performed to determine a color difference vector between an image of the reference material and an image of the unknown material. A purity of the unknown material is determined using the color difference vector.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. The techniques can make it possible to perform rapid analyses on rock samples used in drilling and workover wells. Use of the techniques can reduce the turnaround time to provide results and assess the quality of the materials. This can reduce non-productive time. These techniques provide an alternative to conventional techniques described in the Background. The alternative can be used when some a priori information is available, e.g., when the material to be analyzed is known and just information about its purity is to be determined. Pilot projects can be performed that include a visual observation of different sample colors with the addition of impurities. Some rapid assessments can be performed in the field where scientific/dedicated instruments are not readily available.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques and an algorithm for assessing the chemical (or phase) purity of a material (or compound) based on an analysis of a color image. For example, the analysis may be performed for quality assurance (QA) or quality control (QC) purposes. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Figure 1:
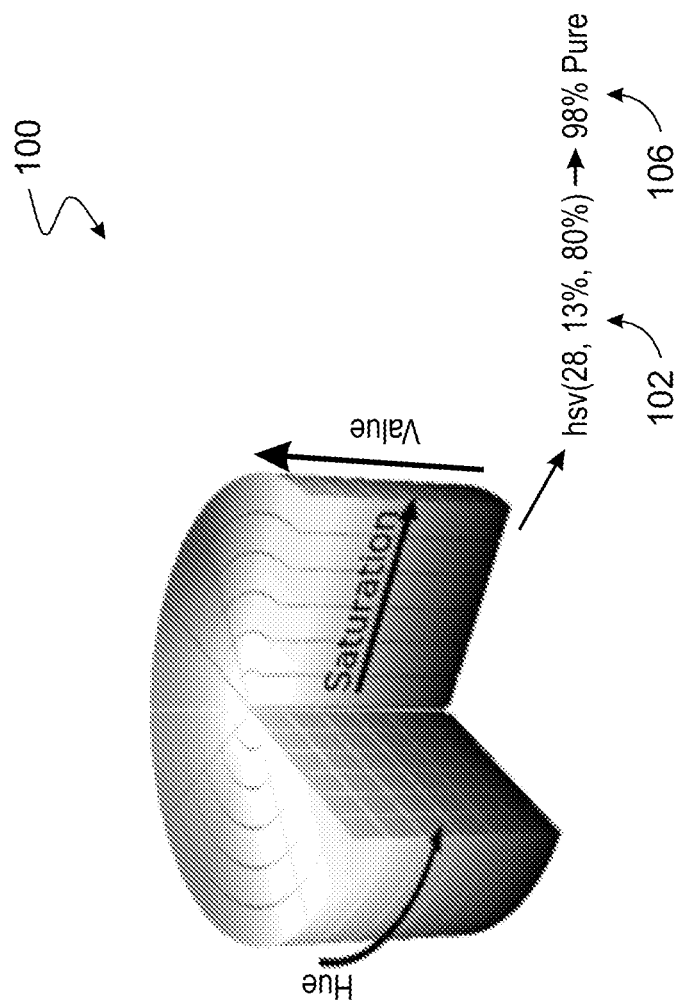
FIG. 1 is a schematic diagram showing an example of determining the hue, saturation, and value (HSV) of a calcite sample, according to some implementations of the present disclosure.
Figure 1:
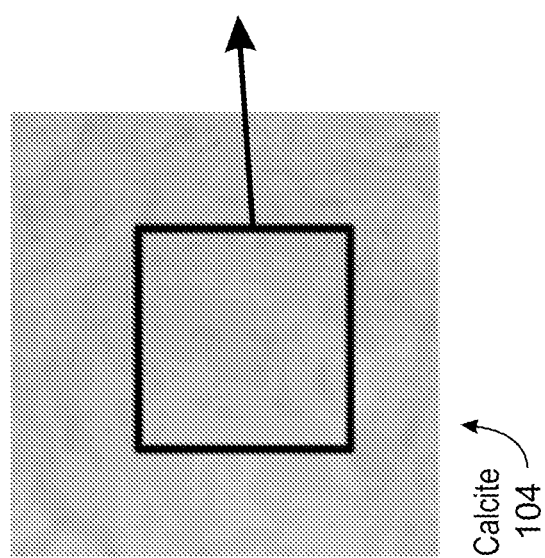

An average colorimetric value can be extracted from an image of a material for which purity is to be assessed. Colorimetry parameters (e.g., three values of hue, saturation, and value (HSV) space) can then be then compared with analogous colorimetry calibration values (or ranges) obtained for the pure material. An example of analysis of calcite is shown in FIG. 1. An analysis of the colorimetric distribution of the sample, rather than of the sole average value, can allow for an estimation of the type of contamination/impurity content. By performing the analysis on pixels or a group of pixels, it is also possible to map the purity or distribution of the impurities.

The techniques of the present disclosure provide for the replacement of a spectrometer with the use of a camera. The camera can be either a traditional camera or a camera that is available on a smart device or some other computer-implemented device. The image can provide rough information about the absorption properties of the material under the given illumination that exists in the present conditions. The illumination can either be natural (e.g., from sunlight), artificial (e.g., from a lamp), or purposely applied (e.g., from a flashlight). The comparison of some information of the image with corresponding data captured for a pure (reference) material under the same illumination conditions can provide information about the sample purity. This technique can partly mimic what a spectrometer does.

A suitable algorithm, as subsequently described, can be used to extract the relevant information from the image. The algorithm can replace a visual comparison that may be used to qualitatively assess the differences between the materials. A colorimetric value can serve as the most informative value for use in the comparison within the purpose of the present disclosure.

A calibration can be used to account for the effects of the impurities and to provide some quantitative purity value. A schematic representation of the proposed technique is given in FIG. 1 (e.g., in which calcite is the example, but the same is valid for any sample) considering the HSV color space. Both absolute and non-absolute color spaces can be employed. A red/green/blue (RGB) color space is the simpler choice, compatible also with the camera raw data (raw RGB pixels readings). Other alternatives that can be used with techniques of the present disclosure include standard RGB (sRGB), International commission on Illumination x-y-z (CIEXYZ); CIE luminance,U*,V* (CIELUV); CIE L*,A*,B* (CIELAB); cyan/magenta/yellow (CMY); cyan/magenta/yellow/black (CMYK); YUV/YIQ/YCbCr; ICtCp; hue, saturation, lightness (HSL); and HSV. The techniques can be used without altering the ideas presented in the present disclosure.

FIG. 1 is a schematic diagram 100 showing an example of determining the hue, saturation, and value (HSV) 102 of a calcite sample 104, according to some implementations of the present disclosure. In this example, a purity 106 of 98% is determined from the HSV values of 28, 13%, and 80%, respectively. Similar types of schematic diagrams can be generated for materials other than calcite.

In the following general process, the term "unknown" is used for a (possibly impure) material to be analyzed, and the "reference" is used for a corresponding material, which may be 100% pure, or may be less than 100% pure but still usable assess the relative purity. An image capture is performed on a reference material having a known purity and an unknown material having an unknown purity for which a priori information is known. The reference material and the unknown material have a same material type. An image comparison of the reference material and the unknown material is performed to determine a color difference vector between an image of the reference material and an image of the unknown material. A purity of the unknown material is determined using the color difference vector.

First Example

In a first example of using the general process, a reference material is physically available and is provided together with the unknown sample. Images of the reference and of the unknown material are taken under a same illumination and a comparison is performed.

Figure 2:
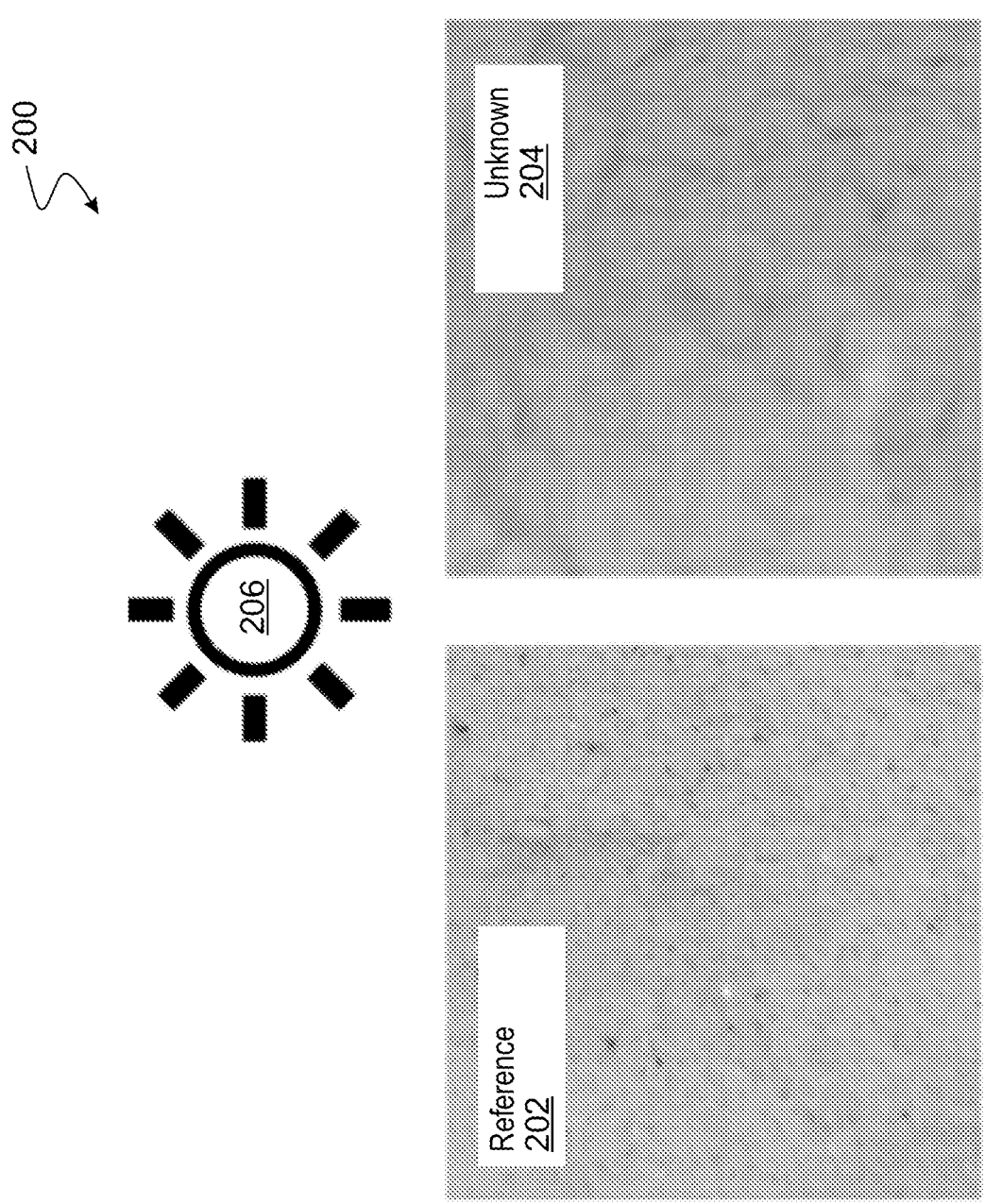
FIG. 2 shows an example of an assessment performed when a reference is available together with the unknown sample, according to some implementations of the present disclosure.

FIG. 2 shows an example of an assessment 200 performed when a reference 202 is available together with the unknown sample 204, according to some implementations of the present disclosure. In this example, performing the image capture of the reference material and the unknown material includes performing a side-by-side image capture of the reference material and the unknown material under common illumination 206. Performing the image comparison of the reference material and the unknown material includes comparing the image of the reference material to the image of the unknown material. A color difference vector between the image of the reference material and the image of the unknown material is determined.

In this example, the images of the reference material and of a color calibration chart are taken under a common illumination. The color calibration chart (e.g., a proper calibration chart or a suitable white card) is employed to obtain information about the properties of the illumination source. Subsequently, the image of the unknown sample and of the same calibration chart are captured under common illumination (not necessarily the same used for the reference). The image of the calibration chart is used to properly consider and remove the effect of the different illumination between the sample and the reference.

In this example, reference 202 is a portion of the image of a pure sample (according to given specifications), and unknown sample 204 is a portion of an impure one (according to given specifications) taken from two batches in the laboratory. The material of reference 202 was accepted, while the material of unknown sample 204 was rejected.

Second Example

Figure 3:
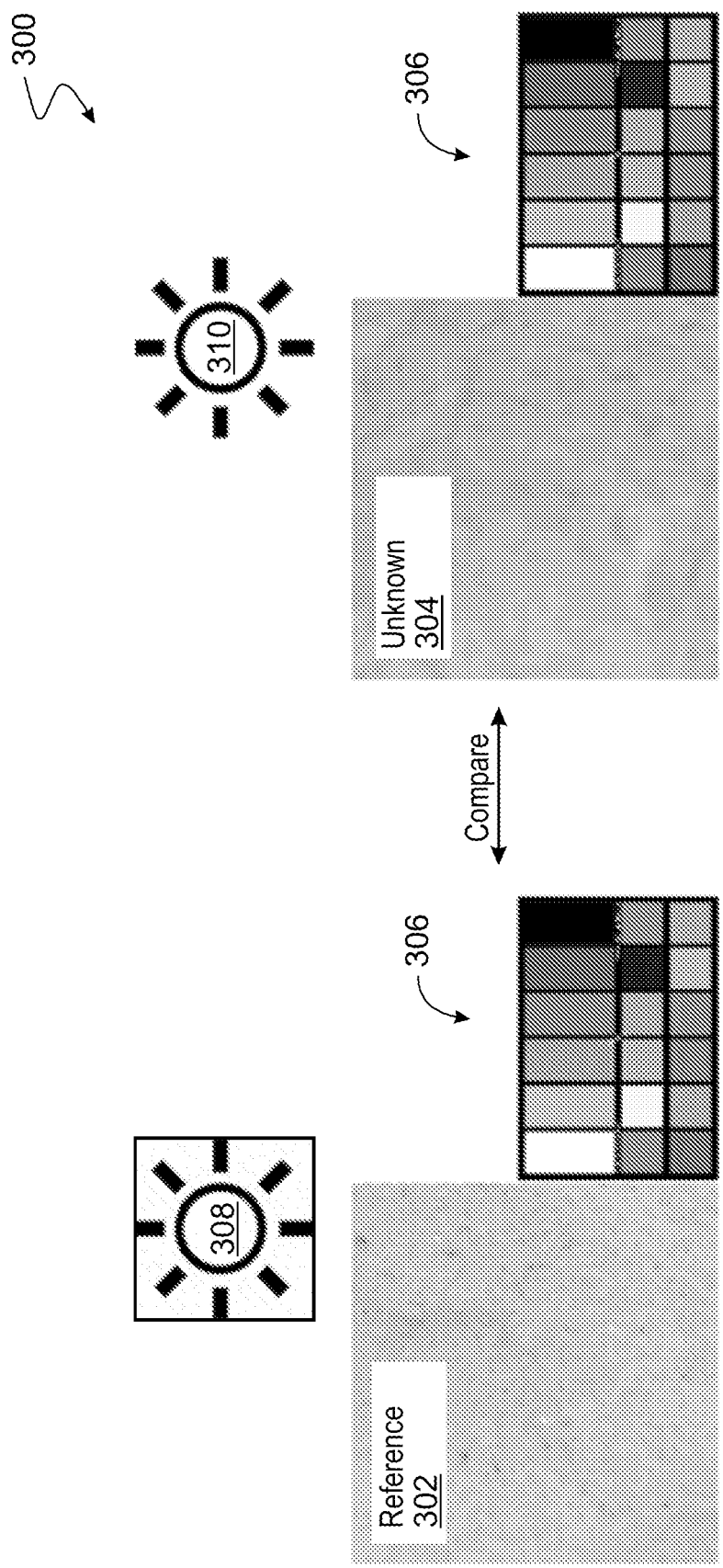
FIG. 3 shows an example of an assessment performed using a calibration chart, according to some implementations of the present disclosure.

FIG. 3 shows an example of an assessment 300 performed using a calibration chart, according to some implementations of the present disclosure. For example, when a reference 302 is not available together with the unknown sample 304, a calibration chart 306 can be used instead.

In the example of FIG. 3, performing the image capture of the reference material and the unknown material includes:

performing a side-by-side image capture of the reference material and a color calibration chart using a first common illumination source, and performing a side-by-side image capture of the color calibration chart and the unknown material using a second common illumination source. In this example, performing the image comparison of the reference material and the unknown material includes: comparing the image of the reference material to an image of the color calibration chart obtained using the first common illumination source; comparing an image of the color calibration chart obtained using the second common illumination source to the image of the unknown material; and determining, based on the comparing, a color difference vector between the image of the reference material and the image of the unknown material.

For a proper comparison to occur in this example, it is important that the same calibration chart or the same type of calibration chart (e.g., having the same color characteristics) is employed for both the reference 302 and the unknown sample 304. Either color correction or white balance algorithms can be used to compare the unknown with the referenced under (e.g., "virtual") common illuminations 308 and 310. The term "virtual" is employed here to mean that both the unknown and the reference samples are compared to a common illumination that was not employed in physical reality.

Comparisons

A visual comparison is now possible between the reference and the unknown, using either of the first or second examples of FIGS. 2 and 3. Any color difference can be used to determine a difference in composition and can be used to qualitatively assess the purity of a sample. For example, the unknown sample in FIG. 2 can be assessed as being not pure when its color, under the same (or virtual) illumination, differs from that of the pure material. This evaluation is however manual and subjective, meaning that an objective method is however needed for an unbiased analysis.

Objective Comparison

In some implementations, user-independent objective techniques for comparing the samples can include (and depend on) the use of one or more quantitative values that can be extracted from the images. For example, the user-independent objective technique can include using a color space and mapping the whole images in that color space. In the following example of FIG. 4, the HSV space can be used without a lack of generality, but other color spaces can be used. In general, any color can be mapped to a vector (or point) in a 3-dimensional HSV space.

Using this technique, the average color of the images (e.g., corresponding to HSV vectors) that can be obtained from for the images of the reference and that for the unknown samples provide two vectors in the HSV space can be compared.

Figure 4:
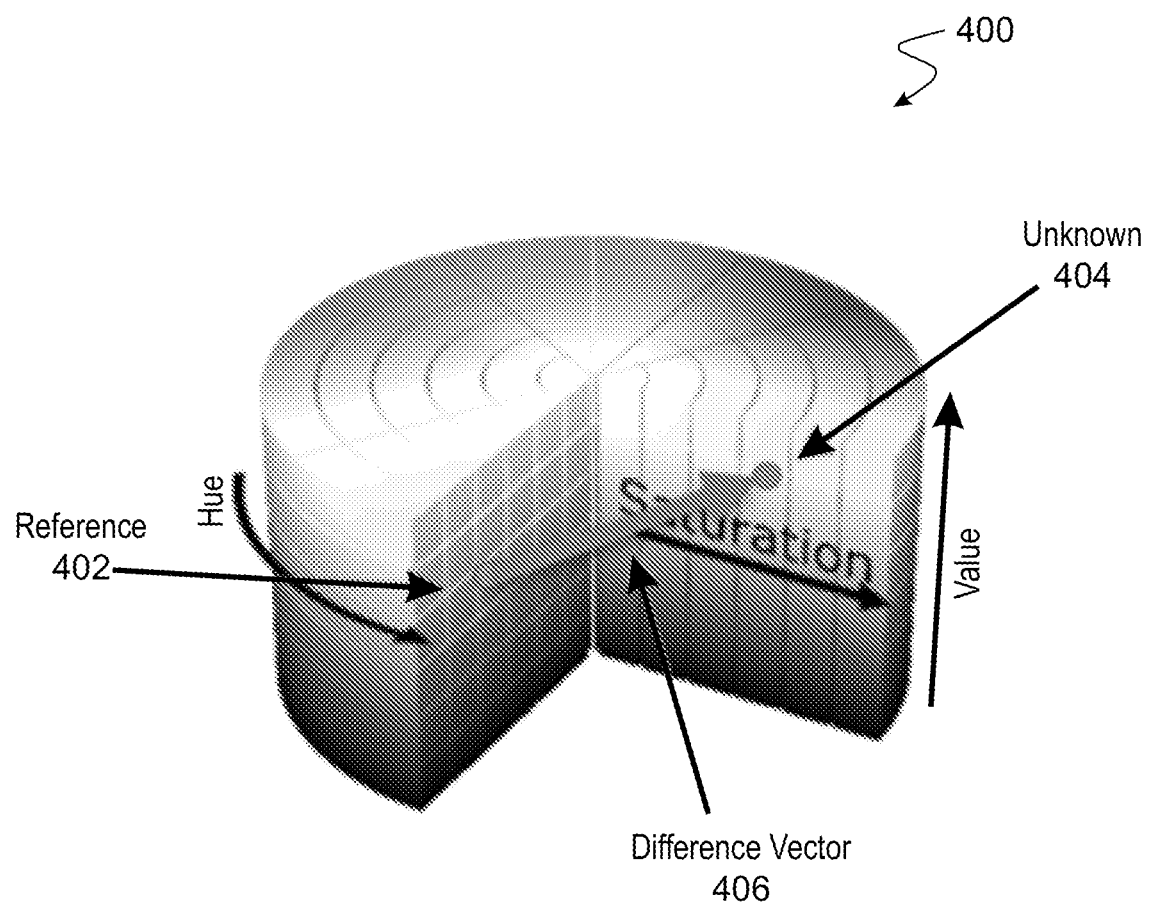
FIG. 4 shows an example, of a technique for mapping a reference and an unknown sample in a color space and generating a corresponding difference vector, according to some implementations of the present disclosure.

FIG. 4 shows an example, of a technique 400 for mapping a reference 402 and an unknown sample 404 in a color space and generating a corresponding difference vector 406, according to some implementations of the present disclosure. In this example, the color space is an HSV space.

To calculate the average color vector for an image, single-color vectors per pixel $c_i$ can be averaged. For example, for an N×M image, the average color vector C can be given by:

$$C = \sum_{i=1}^{N} \sum_{j=1}^{M} \frac{c_{ij}}{NM} \quad (1)$$

The difference between the color vectors of the reference and the unknown sample under the same illumination is representative of the measure of the difference between the two samples. The smaller the norm of this vector, the smaller the difference between the unknown sample and the reference, and therefore the more similar the two samples are. A threshold can be defined for the norm of the difference, e.g., to establish a departure or distance from the full purity of the sample. This is analogous to defining a tolerance radius of the point in the color space outside which the sample is considered not to be pure.

Vignetting, e.g., indicated and defined by the darkening (caused by the camera) of the corners and edges of an image, can artificially alter the local and therefore the average color vector of the image with respect to an ideal one. To reduce the effects of vignetting, a viewport can be defined that centered on the image, inside which the average color vector is calculated (eliminating corners and edges). By considering the pixel (1,1) on the bottom left of the image, the average vector C' can be calculated as:

$$C' = \sum_{i=1}^{N} \sum_{j=1}^{M} \frac{c_{ij}}{NM} \quad (2)$$

where N and M are the sizes of the viewport in pixels, and the sums run over all pixels in the viewport. The vector can be calculated both for the reference and the unknown sample.

In order to improve the reliability of the result, and assess the reliability of the single-color vector, a set of S images can be collected in sequence, and their color vectors $C_1 \ldots C_S$ independently calculated. The average m and variance-covariance matrix $VC_m$ of those color vectors can be, respectively:

$$m = \frac{1}{S}\sum_{i=1}^{S} C_i \quad (3)$$

$$VC_m = \frac{1}{S-1}\sum_{i=1}^{S}(C_i - m)(C_i - m)^T \quad (4)$$

The VC matrix is the representation of the ellipsoid defining the uncertainty around the mean color point in color space. In other words, the VC matrix is the mathematical representation of the small ellipsoids representing the average color in FIG. 4.

Given $Cr_1 \ldots Cr_S$ and $Cu_1 \ldots Cu_S$, respectively, the color vectors for the reference and for the unknown, the color difference D, and the corresponding variance-covariance matrix can be estimated as:

$$D = \frac{1}{S}\sum_{i=1}^{S} C_{ui} - \frac{1}{S}\sum_{i=1}^{S} C_{ri} = C_u - C_r \quad (5)$$

$$VC_D = \frac{1}{S-1}\sum_{i=1}^{S}(C_{ui} - C_{ri} - D)(C_{ui} - C_{ri} - D)^T \quad (6)$$

If the norm of D is larger than the variances, a significant difference exists between the two samples. The difference can be quantified, e.g., as the norm of D.

A quantification of the purity of the phase can be evaluated by correlating the vector difference with the sample purity. A set of samples whose purity has been estimated, e.g., using XRD, need to be measured using the techniques of the present disclosure, with the corresponding difference vectors and variance-covariance matrices evaluated.

A plot of the purity p versus the difference norm norm(D) is established, and a correlation function $f$ is established for which p=$f$(norm(D)) is a good approximation. Using the measured color difference, an estimate of the purity can then be made.

When dealing with natural minerals, it is possible that the impurities in the material have a large and individually different influence in the color space. In this case, it is possible to record a large quantity of images of samples created by adding known quantities of a contaminant. A faster solution is to incrementally add contaminant to a sample, homogenizing the sample continuously and thoroughly, and collecting images.

Figure 5:
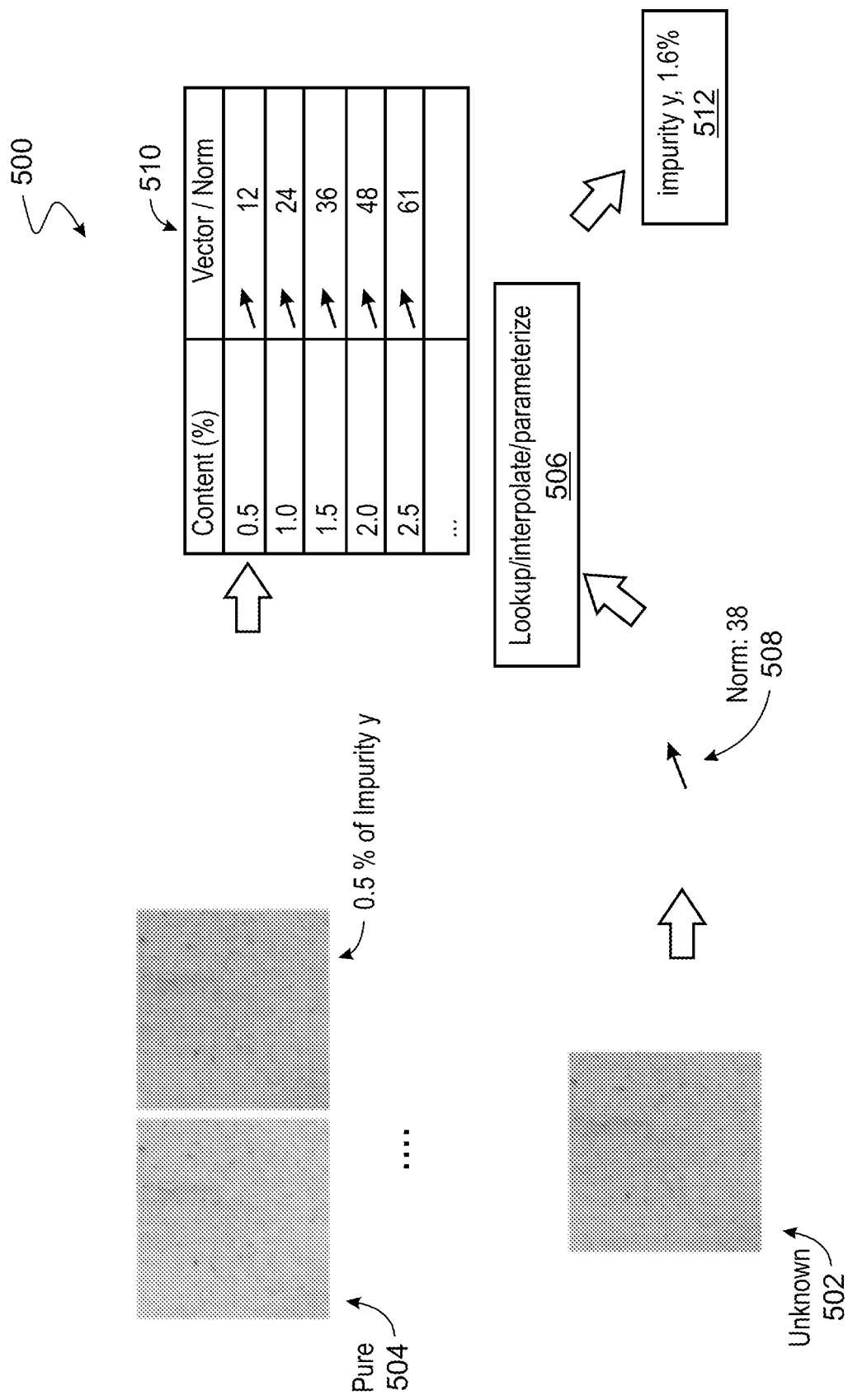
FIG. 5 is a diagram showing an example of a process for the identification of impurity, according to some implementations of the present disclosure.

A large dataset of vectors can be created for each single image, parameterized according to impurity type and content (FIG. 5). A set of difference vectors between impure and pure samples can also be generated. The existence of the set of differences constitutes a known contamination database for the given material type and provides some coverage of the difference vector space versus impurity type and quantity. A sequential search match can then be made in this contamination database for the measured difference vector D between an unknown sample and the reference.

FIG. 5 is a diagram showing an example of a process 500 for the identification of impurity, according to some implementations of the present disclosure. For example, determining the purity of the unknown material 502 can include comparing a color vector of a reference material (e.g., a 5% pure sample 504) to a color vector of an unknown material 502 in hue, saturation, value (HSV) space. The process 500 can be used for the extraction (e.g., a lookup, interpolation, and parameterization 506) of a correlation between impurity type/quantity and color difference vector (unit vector and a norm 508 provided in a table 510). The table look-up can result, for example, in an impurity 512 of 1.6%

Once the closest match is found in terms of direction and magnitude, such match parameters (e.g., quantity and type of impurity) are provided as a result. The residual difference between the database hit and D is then computed, and the search match cycle (of FIG. 5) is restarted with this new vector until the vector norm is smaller than the largest variance of D. This process can provide a possible composition in terms of impurities.

To avoid large errors and work with a continuous set, a correlation between the (impurity type, impurity quantity) couple of parameters and the (direction, norm) points in color space can be established and parameterized, e.g., using an average vector and a polynomial. These can be the parameters stored in the database and used for the analysis of the different vectors.

The homogeneity of the sample can also be provided by analyzing the color vector relative to each pixel in the image (or in the chosen viewport). In this case, the difference between the color vector in each point and the average for the pure sample 504 can be employed to search for impurity following the procedure of FIG. 5. Using a two dimensional (2D) map of the surface in terms of type and quantity of impurity can be obtained.

Figure 6:
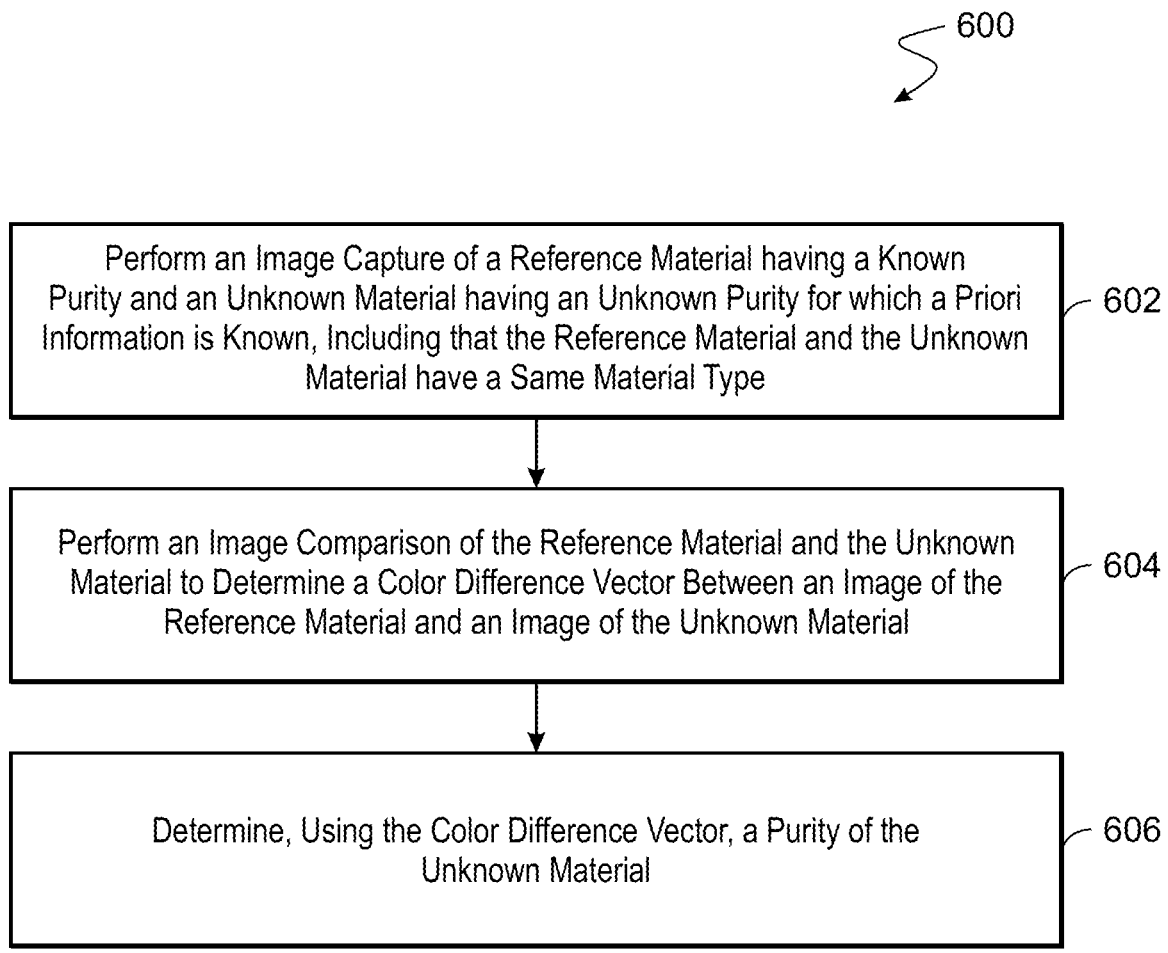
FIG. 6 is a flowchart of an example of a method for determining the purity of an unknown sample, according to some implementations of the present disclosure.

FIG. 6 is a flowchart of an example of a method 600 for determining the purity of an unknown sample, according to some implementations of the present disclosure. For clarity of presentation, the description that follows generally describes method 600 in the context of the other figures in this description. However, it will be understood that method 600 can be performed, for example, by any suitable system, environment, software, and hardware, or a combination of systems, environments, software, and hardware, as appropriate. In some implementations, various steps of method 600 can be run in parallel, in combination, in loops, or in any order.

At 602, an image capture is performed of a reference material having a known purity and an unknown material having an unknown purity for which a priori information is known. The reference material and the unknown material have a same material type. For example, the processes described with reference to FIGS. 2 and 3 can be used. In some implementations, the image capture of the unknown material includes defining a viewport smaller than a size of the unknown material and excluding outside edges of the unknown material contributing to potential vignetting and capturing the image of the unknown material within the viewport. From 602, method 600 proceeds to 604.

At 604, an image comparison of the reference material and the unknown material is performed to determine a color difference vector between an image of the reference material and an image of the unknown material. For example, comparisons described with reference to FIGS. 2 and 3 can be used. From 604, method 600 proceeds to 606.

At 606, a purity of the unknown material is determined using the color difference vector. For example, the determination of purity can be accomplished as described with reference to FIGS. 3-5. After 606, method 600 can stop.

In some implementations, as described with reference to FIG. 2, performing the image capture of the reference material and the unknown material includes performing a side-by-side image capture of the reference material and the unknown material under common illumination. Also, performing the image comparison of the reference material and the unknown material includes comparing the image of the reference material to the image of the unknown material. A color difference vector between the image of the reference material and the image of the unknown material was determined.

In some implementations, as described with reference to FIG. 3, performing the image capture of the reference material and the unknown material includes performing a side-by-side image capture of the reference material and a color calibration chart using a first common illumination source and performing a side-by-side image capture of the color calibration chart and the unknown material using a second common illumination source. Then, performing the image comparison of the reference material and the unknown material includes: comparing the image of the reference material to an image of the color calibration chart obtained using the first common illumination source; comparing an image of the color calibration chart obtained using the second common illumination source to the image of the unknown material; and determining, based on the comparing, a color difference vector between the image of the reference material and the image of the unknown material.

In some implementations, in addition to (or in combination with) any previously-described features, techniques of the present disclosure can include the following. Outputs of the techniques of the present disclosure can be performed before, during, or in combination with wellbore operations, such as to provide inputs to change the settings or parameters of equipment used for drilling. Examples of wellbore operations include forming/drilling a wellbore, hydraulic fracturing, and producing through the wellbore, to name a few. The wellbore operations can be triggered or controlled, for example, by outputs of the methods of the present disclosure. In some implementations, customized user interfaces can present intermediate or final results of the above described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or "app"), or at a central processing facility. The presented information can include suggestions, such as suggested changes in parameters or processing inputs, that the user can select to implement improvements in a production environment, such as in the exploration, production, and/or testing of petrochemical processes or facilities. For example, the suggestions can include parameters that, when selected by the user, can cause a change to, or an improvement in, drilling parameters (including drill bit speed and direction) or overall production of a gas or oil well. The suggestions, when implemented by the user, can improve the speed and accuracy of calculations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 7:
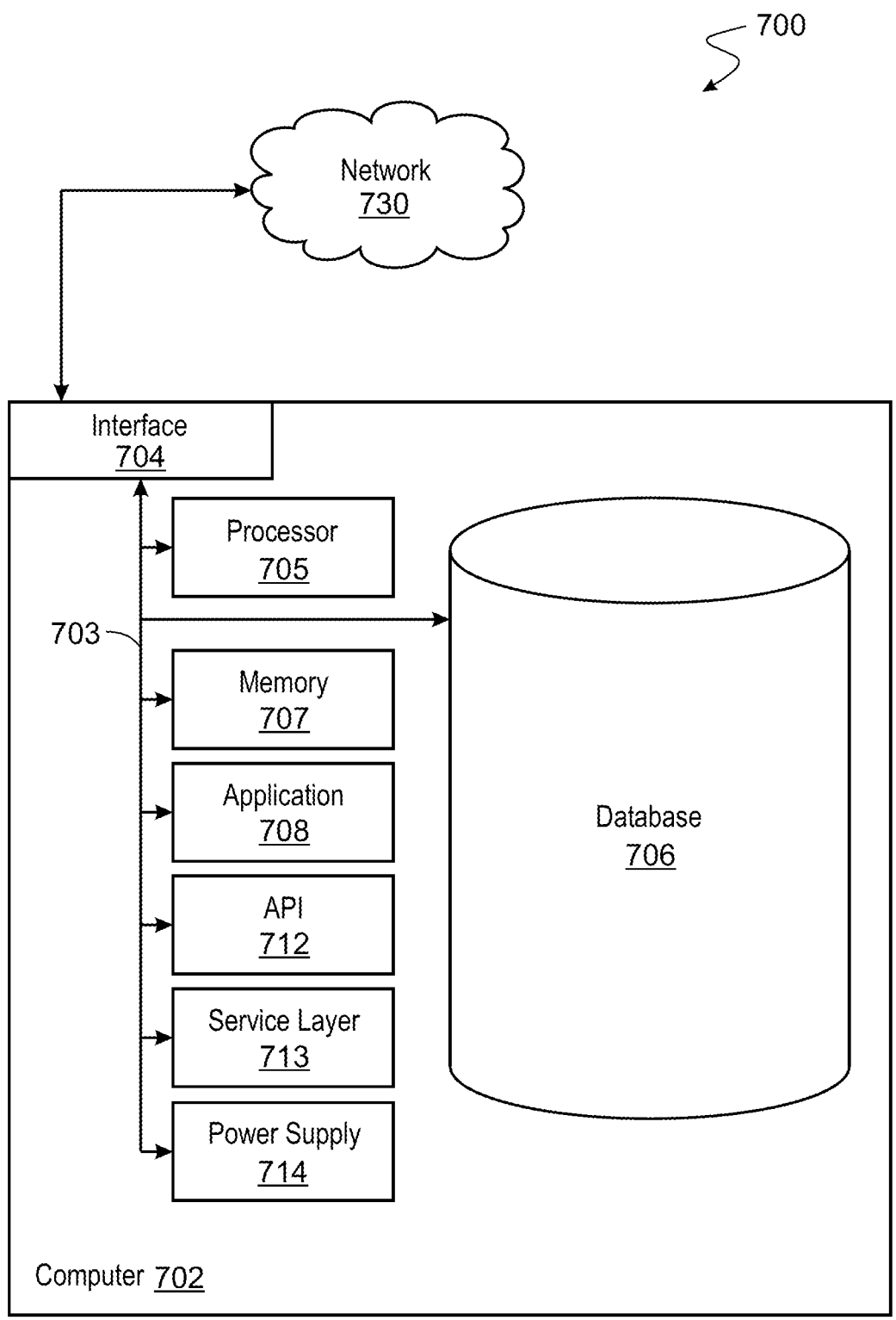
FIG. 7 is a block diagram illustrating an example computer system used to provide computational functionalities associated with described algorithms, methods, functions, processes, flows, and procedures as described in the present disclosure, according to some implementations of the present disclosure.

FIG. 7 is a block diagram of an example computer system 700 used to provide computational functionalities associated with described algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730.

In some implementations, one or more components of the computer 702 can be configured to operate within different environments, including cloud-computing-based environments, local environments, global environments, and combinations of environments.

At a top level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both) over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Described implementations of the subject matter can include one or more features, alone or in combination.

For example, in a first implementation, a computer-implemented method includes the following. An image capture is performed of a reference material having a known purity and an unknown material having an unknown purity for which a priori information is known, including that the reference material and the unknown material have a same material type. An image comparison of the reference material and the unknown material is performed to determine a color difference vector between an image of the reference material and an image of the unknown material. A purity of the unknown material is determined using the color difference vector.

The foregoing and other described implementations can each, optionally, include one or more of the following features:

A first feature, combinable with any of the following features, where performing the image capture of the reference material and the unknown material includes performing a side-by-side image capture of the reference material and the unknown material under common illumination; and where performing the image comparison of the reference material and the unknown material includes: comparing the image of the reference material to the image of the unknown material; and determining a color difference vector between the image of the reference material and the image of the unknown material.

A second feature, combinable with any of the previous or following features, where performing the image capture of the reference material and the unknown material includes: performing a side-by-side image capture of the reference material and a color calibration chart using a first common illumination source; and performing a side-by-side image capture of the color calibration chart and the unknown material using a second common illumination source; and where performing the image comparison of the reference material and the unknown material includes: comparing the image of the reference material to an image of the color calibration chart obtained using the first common illumination source; comparing an image of the color calibration chart obtained using the second common illumination source to the image of the unknown material; and determining, based on the comparing, a color difference vector between the image of the reference material and the image of the unknown material.

A third feature, combinable with any of the previous or following features, where determining the purity of the unknown material includes comparing a color vector of the reference material to a color vector of the unknown material in hue, saturation, value (HSV) space.

A fourth feature, combinable with any of the previous or following features, where performing an image capture of the unknown material includes: defining a viewport smaller than a size of the unknown material and excluding outside edges of the unknown material contributing to potential vignetting; and capturing the image of the unknown material within the viewport.

A fifth feature, combinable with any of the previous or following features, where determining the purity of the unknown material includes performing a table look-up using a color vector in a vector-purity table and performing an interpolation on purity values in the vector-purity table.

A sixth feature, combinable with any of the previous or following features, where the method further includes generating the vector-purity table using by adding a known impurity to a sample in steps and recording the color vector at increasing impurity percentage.

In a second implementation, a non-transitory, computer-readable medium stores one or more instructions executable by a computer system to perform operations including the following. An image capture is performed of a reference material having a known purity and an unknown material having an unknown purity for which a priori information is known, including that the reference material and the unknown material have a same material type. An image comparison of the reference material and the unknown material is performed to determine a color difference vector between an image of the reference material and an image of the unknown material. A purity of the unknown material is determined using the color difference vector.

The foregoing and other described implementations can each, optionally, include one or more of the following features:

A first feature, combinable with any of the following features, where performing the image capture of the reference material and the unknown material includes performing a side-by-side image capture of the reference material and the unknown material under common illumination; and where performing the image comparison of the reference material and the unknown material includes: comparing the image of the reference material to the image of the unknown material; and determining a color difference vector between the image of the reference material and the image of the unknown material.

A second feature, combinable with any of the previous or following features, where performing the image capture of the reference material and the unknown material includes: performing a side-by-side image capture of the reference material and a color calibration chart using a first common illumination source; and performing a side-by-side image capture of the color calibration chart and the unknown material using a second common illumination source; and where performing the image comparison of the reference material and the unknown material includes: comparing the image of the reference material to an image of the color calibration chart obtained using the first common illumination source; comparing an image of the color calibration chart obtained using the second common illumination source to the image of the unknown material; and determining, based on the comparing, a color difference vector between the image of the reference material and the image of the unknown material.

A third feature, combinable with any of the previous or following features, where determining the purity of the unknown material includes comparing a color vector of the reference material to a color vector of the unknown material in hue, saturation, value (HSV) space.

A fourth feature, combinable with any of the previous or following features, where performing an image capture of the unknown material includes: defining a viewport smaller than a size of the unknown material and excluding outside edges of the unknown material contributing to potential vignetting; and capturing the image of the unknown material within the viewport.

A fifth feature, combinable with any of the previous or following features, where determining the purity of the unknown material includes performing a table look-up using a color vector in a vector-purity table and performing an interpolation on purity values in the vector-purity table.

A sixth feature, combinable with any of the previous or following features, where the operations further include generating the vector-purity table using by adding a known impurity to a sample in steps and recording the color vector at increasing impurity percentage.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. An image capture is performed of a reference material having a known purity and an unknown material having an unknown purity for which a priori information is known, including that the reference material and the unknown material have a same material type. An image comparison of the reference material and the unknown material is performed to determine a color difference vector between an image of the reference material and an image of the unknown material. A purity of the unknown material is determined using the color difference vector.

The foregoing and other described implementations can each, optionally, include one or more of the following features:

A first feature, combinable with any of the following features, where performing the image capture of the reference material and the unknown material includes performing a side-by-side image capture of the reference material and the unknown material under common illumination; and where performing the image comparison of the reference material and the unknown material includes: comparing the image of the reference material to the image of the unknown material; and determining a color difference vector between the image of the reference material and the image of the unknown material.

A second feature, combinable with any of the previous or following features, where performing the image capture of the reference material and the unknown material includes: performing a side-by-side image capture of the reference material and a color calibration chart using a first common illumination source; and performing a side-by-side image capture of the color calibration chart and the unknown material using a second common illumination source; and where performing the image comparison of the reference material and the unknown material includes: comparing the image of the reference material to an image of the color calibration chart obtained using the first common illumination source; comparing an image of the color calibration chart obtained using the second common illumination source to the image of the unknown material; and determining, based on the comparing, a color difference vector between the image of the reference material and the image of the unknown material.

A third feature, combinable with any of the previous or following features, where determining the purity of the unknown material includes comparing a color vector of the reference material to a color vector of the unknown material in hue, saturation, value (HSV) space.

A fourth feature, combinable with any of the previous or following features, where performing an image capture of the unknown material includes: defining a viewport smaller than a size of the unknown material and excluding outside edges of the unknown material contributing to potential vignetting; and capturing the image of the unknown material within the viewport.

A fifth feature, combinable with any of the previous or following features, where determining the purity of the unknown material includes performing a table look-up using a color vector in a vector-purity table and performing an interpolation on purity values in the vector-purity table.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks.

Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
performing, using a color calibration chart and a plurality of illumination sources, a side-by-side image capture of a reference material having a known purity to generate a reference material image and an unknown material to generate an unknown material image, the unknown material having an unknown purity for which a priori information is known, wherein the reference material and the unknown material have a same material type;
performing an image comparison of the reference material image to a first calibration image of the color calibration chart obtained using a first common illumination source of the plurality of illumination sources and comparing a second calibration image of the color calibration chart obtained using a second common illumination source of the plurality of illumination sources to the unknown material image;
determining, based on the image comparison, a color difference vector between the reference material image and the unknown material image; and
determining, using the color difference vector, a purity of the unknown material.

2. The computer-implemented method of claim 1:
wherein performing the image comparison of the reference material and the unknown material comprises:
comparing the reference material image to the unknown material image; and
determining a color difference vector between the reference material image and the unknown material image.

3. The computer-implemented method of claim 1, wherein determining the purity of the unknown material comprises comparing a reference color vector of the reference material to an unknown color vector of the unknown material in hue, saturation, value (HSV) space.

4. The computer-implemented method of claim 1, wherein performing the side-by-side image capture of the unknown material comprises:
defining a viewport smaller than a size of the unknown material and excluding outside edges of the unknown material contributing to potential vignetting; and
capturing the unknown material image within the viewport.

5. The computer-implemented method of claim 1, wherein determining the purity of the unknown material comprises performing a table look-up using a color vector in a vector-purity table and performing an interpolation on purity values in the vector-purity table.

6. The computer-implemented method of claim 5, further comprising:
generating the vector-purity table using by adding a known impurity to a sample in steps and recording the color vector at increasing impurity percentage.

7. A non-transitory, computer-readable medium storing one or more instructions executable by a computer system to perform operations comprising:
performing, using a color calibration chart and a plurality of illumination sources, a side-by-side image capture of a reference material having a known purity to generate a reference material image and an unknown material to generate an unknown material image, the unknown material having an unknown purity for which a priori information is known, wherein the reference material and the unknown material have a same material type;
performing an image comparison of the reference material image to a first calibration image of the color calibration chart obtained using a first common illumination source of the plurality of illumination sources and comparing a second calibration image of the color calibration chart obtained using a second common illumination source of the plurality of illumination sources to the unknown material image;
determining, based on the image comparison, a color difference vector between the reference material image and the unknown material image; and
determining, using the color difference vector, a purity of the unknown material.

8. The non-transitory, computer-readable medium of claim 7,
wherein performing the image comparison of the reference material and the unknown material comprises:
comparing the reference material image to the unknown material image; and
determining a color difference vector between the reference material image and the unknown material image.

9. The non-transitory, computer-readable medium of claim 7, wherein determining the purity of the unknown material comprises comparing a reference color vector of the reference material to an unknown color vector of the unknown material in hue, saturation, value (HSV) space.

10. The non-transitory, computer-readable medium of claim 7, wherein performing the side-by-side image capture of the unknown material comprises:
defining a viewport smaller than a size of the unknown material and excluding outside edges of the unknown material contributing to potential vignetting; and
capturing the unknown material image within the viewport.

11. The non-transitory, computer-readable medium of claim 7, wherein determining the purity of the unknown material comprises performing a table look-up using a color vector in a vector-purity table and performing an interpolation on purity values in the vector-purity table.

12. The non-transitory, computer-readable medium of claim 11, the operations further comprising:
generating the vector-purity table using by adding a known impurity to a sample in steps and recording the color vector at increasing impurity percentage.

13. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
performing, using a color calibration chart and a plurality of illumination sources, a side-by-side image capture of a reference material having a known purity to generate a reference material image and an unknown material to generate an unknown material image, the unknown material having an unknown purity for which a priori information is known, wherein the reference material and the unknown material have a same material type;

performing an image comparison of the reference material image to a first calibration image of the color calibration chart obtained using a first common illumination source of the plurality of illumination sources and comparing a second calibration image of the color calibration chart obtained using a second common illumination source of the plurality of illumination sources to the unknown material image;

determining, based on the image comparison, a color difference vector between the reference material image and the unknown material image; and determining, using the color difference vector, a purity of the unknown material.

14. The computer-implemented system of claim 13, wherein performing the image comparison of the reference material and the unknown material comprises:

comparing the reference material image to the unknown material image; and determining a color difference vector between the reference material image and the unknown material image.

15. The computer-implemented system of claim 13, wherein determining the purity of the unknown material comprises comparing a reference color vector of the reference material to an unknown color vector of the unknown material in hue, saturation, value (HSV) space.

16. The computer-implemented system of claim 13, wherein performing the side-by-side image capture of the unknown material comprises:

defining a viewport smaller than a size of the unknown material and excluding outside edges of the unknown material contributing to potential vignetting; and capturing the unknown material image within the viewport.

17. The computer-implemented system of claim 13, wherein determining the purity of the unknown material comprises performing a table look-up using a color vector in a vector-purity table and performing an interpolation on purity values in the vector-purity table.

* * * * *